US011475188B2

(12) United States Patent
Liu et al.

(10) Patent No.: US 11,475,188 B2
(45) Date of Patent: Oct. 18, 2022

(54) FLUID-SOLID COUPLING NUMERICAL SIMULATION METHOD FOR EVALUATING EFFECT OF WELLBORE STRENGTHENING IN FRACTURED FORMATION

(71) Applicant: Southwest Petroleum University, Sichuan (CN)

(72) Inventors: Yang Liu, Sichuan (CN); Tianshou Ma, Sichuan (CN); Ping Chen, Sichuan (CN); Xingyun Xiang, Sichuan (CN); Jiayan Zou, Sichuan (CN)

(73) Assignee: Southwest Petroleum University, Sichuan (CN)

( * ) Notice: Subject to any disclaimer, the term of this patent is extended or adjusted under 35 U.S.C. 154(b) by 0 days.

(21) Appl. No.: 17/387,678

(22) Filed: Jul. 28, 2021

(65) Prior Publication Data
US 2022/0012389 A1 Jan. 13, 2022

(30) Foreign Application Priority Data
Sep. 7, 2020 (CN) .......................... 202010928300.1

(51) Int. Cl.
*G06F 30/28* (2020.01)
*E21B 47/00* (2012.01)
*G06F 111/10* (2020.01)

(52) U.S. Cl.
CPC .............. *G06F 30/28* (2020.01); *E21B 47/00* (2013.01); *E21B 2200/20* (2020.05); *G06F 2111/10* (2020.01)

(58) Field of Classification Search
CPC ...... G06F 30/28; G06F 2111/10; G06F 30/20; E21B 47/00; E21B 47/006; E21B 33/00; E21B 2200/20
See application file for complete search history.

(56) References Cited

U.S. PATENT DOCUMENTS 9,803,475 B2 * 10/2017 Shahri ................... E21B 21/003
2019/0353033 A1 * 11/2019 Ameen ................. E21B 49/003

FOREIGN PATENT DOCUMENTS

| CN | 104778303 A | 7/2015 |
| CN | 107545113 A | 1/2018 |

(Continued)

OTHER PUBLICATIONS

Ruizhi Zhong et al., "Parametric study of controllable parameters in fracture-based wellbore strengthening," Journal of Natural Gas Science and Engineering 43 pp. 13-21 (Year: 2017).*

(Continued)

*Primary Examiner* — Steven W Crabb (57) ABSTRACT

A fluid-solid coupling numerical simulation method for evaluating the effect of wellbore strengthening in a fractured formation includes steps of: establishing an elastic deformation equation of rocks around the wellbore; establishing and solving the fluid flow equations within fractures and plugging zone, respectively; substituting the discretized elastic deformation equation of the rocks around the borehole wall into the fluid flow equations of fractures to obtain a fluid-solid coupling equation set for wellbore strengthening in a fractured formation; and finally solving the fluid-solid coupling equation set; and substituting basic parameters into the fluid-solid coupling equation set, and simulating mechanical response characteristics, width evolution characteristics and flow distribution characteristics of plugged fractures under different parameter combinations. The present invention systematically considers the complex flow states of plugged fractures during wellbore strengthening, as well as the deformation and seepage characteristics plugging zone under multi-force coupling.

3 Claims, 5 Drawing Sheets

(56) References Cited

FOREIGN PATENT DOCUMENTS

| CN | 110005389 A | 7/2019 |
| CN | 110017135 A | 7/2019 |
| CN | 110541703 A | 12/2019 |
| CN | 110826142 A | 2/2020 |
| JP | 2001152541 A | 6/2001 |

OTHER PUBLICATIONS

Ma Tianshou; Research on the Mechanisms of Borehole Collapse Instability for Horizontal Wells in Shale Gas Reservoirs; Southwest Petroleum University Doctoral Dissertation; Jun. 2015.

* cited by examiner

FLUID-SOLID COUPLING NUMERICAL SIMULATION METHOD FOR EVALUATING EFFECT OF WELLBORE STRENGTHENING IN FRACTURED FORMATION

CROSS REFERENCE OF RELATED APPLICATION

The present invention claims priority under 35 U.S.C. 119(a-d) to CN 202010928300.1, filed Sep. 7, 2020.

BACKGROUND OF THE PRESENT INVENTION

Field of Invention

The present invention relates to a technical field of oil and gas exploration, and more particularly to a fluid-solid coupling numerical simulation method for evaluating an effect of wellbore strengthening in a fractured formation.

Description of Related Arts

With the global oil and gas exploration and development transiting to deep formations and unconventional oil and gas resources, the occurrence of drilling into broken formation, fractured formation and formation with complex pressure system is greatly increased. These formations often resulted in a considerable drilling fluid loss. Lost circulation not only causes large loss of drilling fluid materials and long non-production time, but also easily induces downhole failures such as wellbore instability, blowout and sticking. Furthermore, lost circulation can also cause immeasurable damage to reservoirs. The wellbore strengthening technology is one of the effective means for controlling lost circulation, which adopts lost circulation materials with different types, particle sizes and concentrations to bridge at proper positions of fractures to generate a tight plugging zone. Then the dual goals for controlling lost circulation and improving the bearing capacity of the formation can be realized. However, how to accurately predict the wellbore strengthening effect and optimize the type, size and concentration of lost circulation materials are of great importance to the lost circulation prevention and control. Therefore, scholars all over the world have conducted an intensive study on the method of predicting the wellbore strengthening effect in a fractured formation. In 2012, Morita et al. developed a fracture-mechanics-based model that considers in-situ stress, wellbore pressure and fracture internal pressure to predict the effect of wellbore strengthening; in 2014, Shahri et al. created a semi-analytic model for predicting fracture width and wellbore strengthening effect based on the boundary element theory, and then a technical process for optimizing the scheme of wellbore strengthening was formed preliminarily; in 2016, Feng et al. derived an analytical model for evaluating the wellbore strengthening effect based on a linear elastic fracture mechanics theory and a Kirsch solution; and in 2017, Miska et al. firstly combined a hydraulic fracturing model with a mass conservation principle to study the mechanical mechanisms and effect of wellbore strengthening. Although the above models and methods provide certain theoretical guidance for the design of the wellbore strengthening scheme, all are of some limitations. For example, the wellbore strengthening treatment belongs to a typical fluid-solid coupling process, the interaction between rock-fracture-plug systems around the borehole wall must be considered. However, the conventional analytical or numerical models were established based on the constant pressure boundary condition, and the influence of plugging zone permeability and the interaction between the plugging zone and the fracture surfaces are rarely considered. As a result, the prediction of the wellbore strengthening effect is distorted, and thus providing insufficient theoretical basis for the plugging scheme for the wellbore strengthening.

SUMMARY OF THE PRESENT INVENTION

In view of the above problems, the present invention provides a fluid-solid coupling numerical simulation method for evaluating the wellbore strengthening in a fractured formation. This method systematically considers the complex flow states of plugged fractures during wellbore strengthening, as well as the deformation and seepage characteristics plugging zone under multi-force coupling.

Accordingly, in order to accomplish the above objects, the present invention provides:

a fluid-solid coupling numerical simulation method for evaluating a wellbore strengthening effect of a fractured formation, comprising steps of:

S1, comprehensively considering influences of in-situ stresses, a wellbore pressure, a fluid pressure in a plugged fracture, and interaction between a plugging zone and fracture surfaces, establishing an elastic deformation equation of rocks around a borehole wall, and setting initial and boundary conditions;

S2, establishing fluid flow equations for fractures and the plugging zone according to a mass conservation equation and a continuity equation, respectively;

S3, seeking a numerical solution of the established elastic deformation equation of the rocks around the borehole wall by using a displacement discontinuous method, solving the established fluid flow equation for the fractures by a finite difference method, substituting the discretized elastic deformation equation into the flow equation for the fractures to obtain a fluid-solid coupling equation set for wellbore strengthening in the fractured formation, and finally solving the fluid-solid coupling equation set by a fully coupled iterative method; and S4, substituting basic parameters into the fluid-solid coupling equation set, and simulating mechanical response characteristics, width evolution characteristics and flow distribution characteristics of plugged fractures under different parameter combinations.

Preferably, in the step S1, the elastic deformation equation of the rocks around the borehole wall under the influences of the in-situ stresses, the wellbore pressure, and the fluid pressure in the plugged fractures is:

$$\Sigma_{j=1}^{N}(H_{sn})_{ij}[u_s^j]+\Sigma_{j=1}^{N}(H_{nn})_{ij}[u_n^j]=\sigma_n(s_i)-P_f(s_i)$$

$$\Sigma_{j=1}^{N}(H_{ss})_{ij}[u_s^j]+\Sigma_{j=1}^{N}(H_{ns})_{ij}[u_n^j]=0 \quad (1)$$

wherein $$H_{ss} = \frac{E}{1+v}[\cos2\beta f_{xy} - \sin2\beta f_{xx} - y(\cos2\beta f_{xyy} - \sin2\beta f_{yyy})]\sin2\beta +$$
$$\frac{E}{1+v}[\sin2\beta f_{xy} - \cos2\beta f_{xx} + y(\sin2\beta f_{xyy} + \cos2\beta f_{yyy})]\cos2\beta$$

$$H_{sn} = \frac{E}{1+v}[-y(\sin2\beta f_{xyy} + \cos2\beta f_{yyy})]\sin2\beta +$$
$$\frac{E}{1+v}[-y(\cos2\beta f_{xyy} + \sin2\beta f_{yyy})]\cos2\beta$$

$$H_{ns} = \frac{E}{1+v}[2\cos^2\beta f_{xy} + \sin2\beta f_{xx} + y(\cos2\beta f_{xyy} - \sin2\beta f_{yyy})]\sin^2\beta -$$
$$\frac{E}{1+v}[2\sin^2\beta f_{xy} - \sin2\beta f_{xx} - y(\cos2\beta f_{xyy} - \sin2\beta f_{yyy})]\cos^2\beta +$$
$$\frac{E}{1+v}[2\sin^2\beta f_{xy} - \sin2\beta f_{xx} - y(\cos2\beta f_{xyy} - \sin2\beta f_{yyy})]\cos^2\beta$$

$$H_{nn} = \frac{E}{1+v}[-f_{xy} + y(\sin2\beta f_{xyy} + \cos2\beta f_{yyy})]\sin^2\beta -$$
$$\frac{E}{1+v}[-y(\cos2\beta f_{xyy} + \sin2\beta f_{yyy})]\sin2\beta +$$
$$\frac{E}{1+v}[-f_{xy} - y(\sin2\beta f_{xyy} + \cos2\beta f_{yyy})]\cos^2\beta$$

(2)

in the equation (2), $$f_{xy} = \frac{1}{4\pi(1-v)}\left[\frac{y}{(x-L)^2+y^2} - \frac{y}{(x+L)^2+y^2}\right] \quad (3)$$

$$f_{yy} = -f_{xx} = \frac{-1}{4\pi(1-v)}\left[\frac{x-L}{(x-L)^2+y^2} - \frac{x+L}{(x+L)^2+y^2}\right]$$

$$f_{xyy} = \frac{1}{4\pi(1-v)}\left\{\frac{(x-L)^2-y^2}{[(x-L)^2+y^2]^2} - \frac{(x+L)^2-y^2}{[(x+L)^2+y^2]^2}\right\}$$

$$f_{yyy} = \frac{2y}{4\pi(1-v)}\left\{\frac{x-L}{[(x-L)^2+y^2]^2} - \frac{x+L}{[(x+L)^2+y^2]^2}\right\}$$

$$\sigma_n(x) = \sigma_h\left(1+\frac{R^2}{x^2}\right) + \frac{\sigma_H-\sigma_h}{2}\left(\frac{R^2}{x^2} - 3\frac{R^4}{x^4}\right) \quad (4)$$

wherein $H_{ij}(i,j=n,s)$ are hypersingular Green's functions derived by stress components in an arbitrary position, MPa/m; $f_{xy}$ and $f_{yy}$ are stress components related to partial derivative of a function $f$, $m^{-1}$; $f_{xyy}$ and $f_{yyy}$ are stress components related to partial derivative of the function $f$, $m^{-2}$; $\sigma_H$ is a maximum horizontal stress, MPa; $\sigma_h$ is a minimum horizontal stress, MPa; $\sigma_n$ is a normal stress on a fracture surface, MPa; Pf is a fluid pressure in a fracture, MPa; $[u_n{}^j]$ is a normal displacement discontinuity of a j-th fracture unit, m; $[u_s{}^j]$ is a shear displacement discontinuity of the j-th fracture unit, m; L is a fracture length, m; R is a borehole radius, mm; E is an elastic modulus of a formation rock, GPa; v is a Poisson's ratio, dimensionless; s is a horizontal ordinate of a fracture unit at any position along a fracture length direction, m; β is an x-direction included angle between a local coordinate system and a global coordinate system of the fracture unit, °.

Preferably, in the step S1, assumptions used for establishing the elastic deformation equation of the rocks around the borehole wall are: bi-wing fractures emanating from the wellbore are distributed along a maximum horizontal stress direction, and formations around the fractures are isotropic and impermeable elastic media.

Preferably, in the step S1, the initial and boundary conditions of the elastic deformation equation of the rocks around the borehole wall are:

a fluid pressure at a fracture mouth is equal to a wellbore pressure, and a fracture opening and shearing displacement discontinuities at a fracture tip are identically equal zero:

$$P_{fi}(R,t)=P_w \quad (6)$$

$$w(R+L,t)=u(R+L,t)=0 \quad (7)$$

wherein $P_{fi}$ is the fluid pressure at the fracture mouth, MPa; $P_w$ is the wellbore pressure, MPa; w is the fracture opening, m; u is the shearing displacement discontinuities, m; R is a wellbore radius, mm; L is a fracture length, m; t is time, s.

Preferably, in step S2, after the plugging zone is formed, a fluid flow in fractures consists of two states: a laminar flow and a Darcy flow, and the fluid flow inside the opened fractures is:

$$\frac{\partial w}{\partial t} = \frac{\partial}{\partial s}\left[\frac{w^3}{\mu'}\frac{\partial P_f}{\partial s}\right] \quad (8)$$

wherein $P_f$ is a fracture internal pressure, MPa; s is a horizontal ordinate of a fracture unit at any position along a fracture length direction, m; w is a fracture opening, m; t is time, s.

Preferably, a fluid flow within the plugging zone is:

$$\frac{\partial P_f}{\partial t} - \frac{1}{12\mu\chi_1}\frac{\partial}{\partial s}\left(\varpi^2\frac{\partial P_f}{\partial s}\right) + \frac{\varpi_0}{\chi_1\chi_2\pi}\frac{\partial(|u|)}{\partial t} = 0 \quad (14)$$

wherein $$\chi_2 = \begin{cases} const & \text{when } |u| \le L_c \\ \infty & \text{when } |u| > L_c \end{cases} \quad (15)$$

wherein μ is a dynamic viscosity of an injected fluid, mPa·s; $P_f$ is a fluid pressure in fractures at a plugged location, MPa; $\overline{\omega}$ is an effective hydraulic aperture of the plugging zone, m; $\chi_1$ is a compressibility of the plugging zone, usually $10^{-6}$~$^{-8}$/Pa; $\chi_2$ is a shear-expansion characteristic of the plugged fractures, m; u is shearing displacement discontinuities, m; t is time, s; $\overline{\omega}_0$ is an initial hydraulic aperture of the plugging zone, m.

Preferably, after a stable plugging zone is formed in wellbore fractures, an injection rate is equal to total influxes of the wellbore fractures with continuous injection of a drilling fluid:

$$\sum_{i=1}^{N} q_i(0,t) = Q_0 \quad (5)$$

wherein $q_i$ is an injection flux into a fracture i, m²/s; $Q_0$ is the injection rate, m²/s.

Preferably, in the step S3, when solving the fluid-solid coupling equation set, if a fracture width at a plugged position is larger than a preset plugging zone width, the plugging zone is subjected to tensile instability, and an injected fluid bypasses the plugging zone to enter a fracture tip; and if a stress intensity factor at a plugged fracture tip is higher than a fracture toughness of a formation rock, plug fails completely and fractures begin to propagate:

$$K_I = K_{IC} \quad (16)$$

wherein $$K_I = 0.806 \frac{E' w_{tip}}{4\sqrt{\Delta\xi/\pi}} \quad (17)$$

$$E' = \frac{E}{1-v^2} \quad (18)$$

wherein $K_I$ is a Mode-I stress intensity factor at the plugged fracture tip, MPa·m$^{0.5}$; $w_{tip}$ is a width near the fracture tip, m; $\Delta\xi$ is a length of a displacement discontinuity unit, m; and $K_{IC}$ is the fracture toughness of formation rock, MPa·m$^{0.5}$.

Preferably, in the step S4, the basic parameters comprise in-situ stress parameters, rock mechanics parameters, fracture geometric parameters, plugging zone geometric and permeability parameters, a fluid viscosity and a displacement.

Beneficial effects of the present invention are as follows.

The method of the present invention fills the blank of the fluid-solid coupling design method for wellbore strengthening of the fractured formation. The system considers complex flow forms in plugged fractures during wellbore strengthening, as well as plugging zone deformation and seepage characteristics under multi-force coupling, so as to eliminate the limitation of conventional analytical method or numerical simulation method when selecting a constant pressure boundary condition or a non-permeable plugging zone. The fluid-solid coupling numerical simulation method of the present invention can provide theoretical support and technical guidance for parameter design and effect evaluation of wellbore strengthening for the fractured formation.

BRIEF DESCRIPTION OF THE DRAWINGS

In order to more clearly illustrate technical solutions of embodiments of the present invention, drawings of the embodiments will be briefly described below. Obviously, the drawings described only relate to some embodiments of the present invention, and are not intended to be limiting.

DETAILED DESCRIPTION OF THE PREFERRED EMBODIMENT

In order to clarify the purpose, technical solutions and advantages of the embodiments of the present invention, the technical solutions of the embodiments of the present invention will be clearly and completely described below with the accompanying drawings. The described embodiments are only a few embodiments of the present invention rather than all. All other embodiments, which can be derived by those skilled in the art from the described embodiments of the present invention without any inventive step, are within the protection scope of the present invention.

Unless otherwise defined, technical or scientific terms used herein shall have the ordinary meaning as understood by those skilled in the art. The use of "include", "comprise", and the like, in the present invention is intended to mean that the elements or items listed before that word include the elements or items listed after that word, and their equivalents, without excluding other elements or items. The words "upper", "lower", "left", "right", and the like are used merely to indicate relative positional relationships, and when the absolute position of the object being described is changed, the relative positional relationships may also be changed accordingly.

The present invention will be further illustrated with the drawings and embodiments.

Referring to FIGS. 1-8, a fluid-solid coupling numerical simulation method for evaluating a wellbore strengthening effect of a fractured formation is provided, comprising steps as follows.

Figure 2:
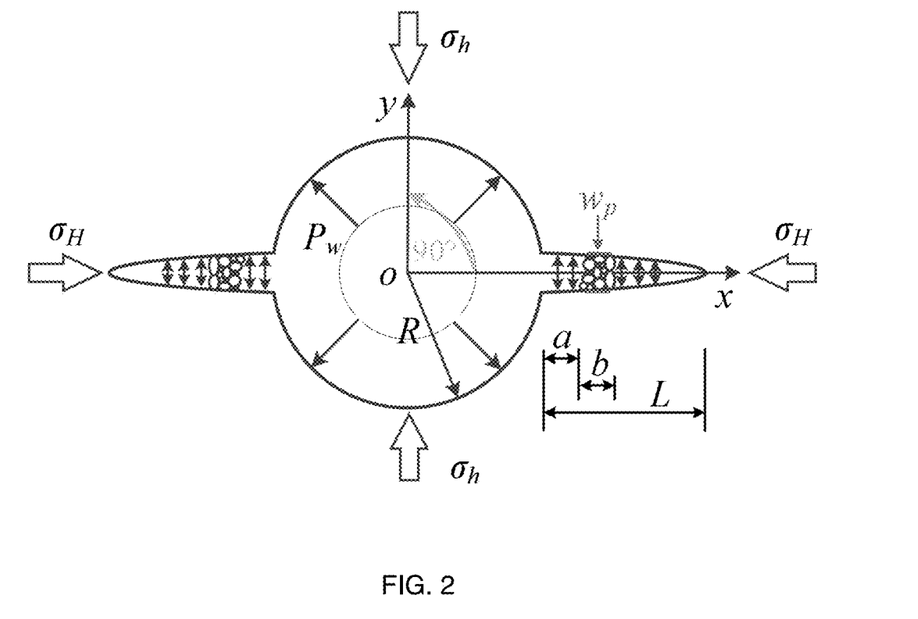
FIG. 2 is a physical model of the fracture formation wellbore strengthening according to the present invention.

S1, referring to FIG. 2, assuming that bi-wing fractures emanating from the wellbore are distributed along the maximum horizontal stress direction and formations around the fractures are isotropic and impermeable elastic media; comprehensively considering influences of in-situ stresses, wellbore pressure, fluid pressure in plugged fracture, and the interaction between plugging zone and fracture surfaces, establishing an elastic deformation equation of rocks around the borehole wall, and setting initial and boundary conditions;

wherein the elastic deformation equation of the rocks around the borehole wall under the influences of the in-situ stresses, the wellbore pressure, and the fluid pressure in the plugged fractures is:

$$\sum_{j=1}^{N}(H_{sn})_{ij}[u_s^j]+\sum_{j=1}^{N}(H_{nn})_{ij}[u_n^j]=\sigma_n(s_i)-P_f(s_i)$$

$$\sum_{j=1}^{N}(H_{ss})_{ij}[u_s^j]+\sum_{j=1}^{N}(H_{ns})_{ij}[u_n^j]=0 \quad (1)$$

wherein the hypersingular Green's function $H_{ij}$ (i,j=n,s) derived by the stress components in an arbitrary position (x,y) is:

$$H_{ss} = \frac{E}{1+v}[\cos 2\beta f_{xy} - \sin 2\beta f_{xx} - y(\cos 2\beta f_{xyy} - \sin 2\beta f_{yyy})]\sin 2\beta +$$
$$\frac{E}{1+v}[\sin 2\beta f_{xy} - \cos 2\beta f_{xx} + y(\sin 2\beta f_{xyy} + \cos 2\beta f_{yyy})]\cos 2\beta$$

$$H_{sn} = \frac{E}{1+v}[-y(\sin 2\beta f_{xyy} + \cos 2\beta f_{yyy})]\sin 2\beta +$$
$$\frac{E}{1+v}[-y(\cos 2\beta f_{xyy} + \sin 2\beta f_{yyy})]\cos 2\beta$$

$$H_{ns} = \frac{E}{1+v}[2\cos^2\beta f_{xy} + \sin 2\beta f_{xx} + y(\cos 2\beta f_{xyy} - \sin 2\beta f_{yyy})]\sin^2\beta -$$
$$\frac{E}{1+v}[2\sin^2\beta f_{xy} - \sin 2\beta f_{xx} - y(\cos 2\beta f_{xyy} - \sin 2\beta f_{yyy})]\cos^2\beta +$$
$$\frac{E}{1+v}[2\sin^2\beta f_{xy} - \sin 2\beta f_{xx} - y(\cos 2\beta f_{xyy} - \sin 2\beta f_{yyy})]\cos^2\beta$$

$$H_{nn} = \frac{E}{1+v}[-f_{xy} + y(\sin 2\beta f_{xyy} + \cos 2\beta f_{yyy})]\sin^2\beta -$$
$$\frac{E}{1+v}[-y(\cos 2\beta f_{xyy} + \sin 2\beta f_{yyy})]\sin 2\beta +$$
$$\frac{E}{1+v}[-f_{xy} - y(\sin 2\beta f_{xyy} + \cos 2\beta f_{yyy})]\cos^2\beta$$

the stress components associated with partial derivative of the function $f$ can be expressed as:

$$f_{xy} = \frac{1}{4\pi(1-v)}\left[\frac{y}{(x-L)^2+y^2} - \frac{y}{(x+L)^2+y^2}\right] \quad (3)$$

$$f_{yy} = -f_{xx} = \frac{-1}{4\pi(1-v)}\left[\frac{x-L}{(x-L)^2+y^2} - \frac{x+L}{(x+L)^2+y^2}\right]$$

$$f_{xyy} = \frac{1}{4\pi(1-v)}\left\{\frac{(x-L)^2-y^2}{[(x-L)^2+y^2]^2} - \frac{(x+L)^2-y^2}{[(x+L)^2+y^2]^2}\right\}$$

$$f_{yyy} = \frac{2y}{4\pi(1-v)}\left\{\frac{x-L}{[(x-L)^2+y^2]^2} - \frac{x+L}{[(x+L)^2+y^2]^2}\right\}$$

the normal stress acting on the fracture surface along fracture tip direction can be expressed as:

$$\sigma_n(x) = \sigma_h\left(1+\frac{R^2}{x^2}\right) + \frac{\sigma_H-\sigma_h}{2}\left(\frac{R^2}{x^2}-3\frac{R^4}{x^4}\right) \quad (4)$$

wherein $\sigma_H$ is the maximum horizontal stress, MPa; $\sigma_h$ is the minimum horizontal stress, MPa; $\sigma_n$ is the normal stress on the fracture surface, MPa; $P_f$ is fluid pressure in fractures, MPa; $[u_n^j]$ is the normal displacement discontinuity (namely the fracture width w) of the j-th fracture unit, m; $[u_s^j]$ is the shear displacement discontinuity (namely the fracture surface shear slip u) of the j-th fracture unit, m; L is fracture length, m; R is borehole radius, mm; E is elastic modulus of formation rock, GPa; v is a Poisson's ratio, dimensionless; s is the horizontal ordinate of a fracture unit at arbitrary position along the fracture length direction, m; β is an x-direction included angle between the local coordinate system and the global coordinate system of the fracture unit, °.

(2)

Since the fracture mouth is in complete contact with the wellbore wall, fluid pressure at the fracture mouth is equal to the wellbore pressure, and the fracture opening and shearing displacement discontinuities at the fracture tip are identically equal zero:

$$P_{fi}(R,t)=P_w \quad (6)$$

$$w(R+L,t)=u(R+L,t)=0 \quad (7)$$

wherein $P_{fi}$ is the fluid pressure at the fracture mouth, MPa; $P_w$ is the wellbore pressure, MPa; w is the fracture opening, m; u is the shearing displacement discontinuities, m; R wellbore radius, mm; L is fracture length, m; t is time, s.

S2, assuming that drill fluid is a Newtonian fluid and its compressibility is ignored; after plugging zone is formed, the fluid flow in fractures are actually comprised of two states: laminar flow and Darcy flow; the fluid flow equations inside the opened fractures and the plugging zone can be established based on the mass conservation equation and the continuity equation, respectively.

After plugging zone is formed, the fluid flow in fractures are comprised actually comprised of two states: laminar flow and Darcy flow, and the fluid flow inside the opened fractures is:

$$\frac{\partial w}{\partial t} = \frac{\partial}{\partial s}\left[\frac{w^3 \partial P_f}{\mu' \partial s}\right] \quad (8)$$

for a dense and stable plugging zone, the fluid flow in the plugging zone satisfies Darcy's law:

$$q_m = -\rho \frac{k}{\mu} \frac{\partial P_f}{\partial s} \quad (9)$$

the fluid flow in the plugging zone satisfies a mass conservation equation, namely the fluid mass change rate per unit volume of the plugging zone is equal to the fluid mass flux change rate along plugging zone length direction:

$$\frac{\partial q_m}{\partial s} = \frac{\partial m}{\partial t} = 0 \quad (10)$$

wherein the fluid mass change rate per unit volume of the plugging zone can be expressed as:

$$\frac{\partial m}{\partial t} = \rho \frac{1}{\bar{\omega}} \frac{\partial \bar{\omega}}{\partial t} \quad (11)$$

for a partially plugged wellbore fracture, fluid invasion in the plugging zone can directly influence the change of hydraulic opening of the plugging zone; the change of the hydraulic opening of the plugging zone is related to several parameters, such as fluid pressure, shearing displacement discontinuities, and etc., obeying a nonlinear spring model; its evolution equation is:

$$\frac{\partial \bar{\omega}}{\partial t} = \chi_1 \bar{\omega} \frac{\partial P_f}{\partial t} + \frac{\bar{\omega}_0}{\chi_2} \frac{\partial (|u|)}{\partial t} \quad (12)$$

for a given hydraulic opening of the plugging zone, the plugging zone permeability thereof can be determined by:

$$k = \frac{\bar{\omega}^2}{12} \quad (13)$$

combining equations (8)-(13), the pressure diffusion equation for describing the fluid flow in the plugging zone can be obtained:

$$\frac{\partial P_f}{\partial t} - \frac{1}{12\mu\chi_1} \frac{\partial}{\partial s}\left(\bar{\omega}^2 \frac{\partial P_f}{\partial s}\right) + \frac{\bar{\omega}_0}{\chi_1 \chi_2 \bar{\omega}} \frac{\partial (|u|)}{\partial t} = 0 \quad (14)$$

wherein
according to experimental results of Samuelson et al (2009), a value of $\chi_2$ is determined by the following piecewise functions:

$$\chi_2 = \begin{cases} const & when\ |u| \le L_c \\ \infty & when\ |u| > L_c \end{cases} \quad (15)$$

wherein $q_m$ is the fluid mass flux in the plugging zone, g/s; $\rho$ is fluid density, g/cm$^3$; k is the permeability of plugging zone, mD; $\mu$ is dynamic viscosity of the injected fluid, mPa·s; $P_f$ is fluid pressure in fracture at the plugged location, MPa; $\bar{\omega}$ is an effective hydraulic opening of the plugging zone, m; $\chi_1$ is the compressibility of the plugging zone, usually $10^{-6\sim-8}$/Pa; $\chi_2$ is a shear-expansion characteristic of the plugged fractures, m; u is a shear displacement, m; s is the horizontal ordinate of a fracture unit at arbitrary position along the fracture length direction, m; w is fracture opening, m; t is time, s; $\bar{\omega}_0$ is an initial hydraulic opening of the plugging zone, m; m is fluid mass per unit volume in a seepage channel of the plugging zone, g/cm$^3$; k is the permeability of the plugging zone, mD; $L_c$ is the critical slip characterizing dynamic friction behaviors, m.

Figure 1:
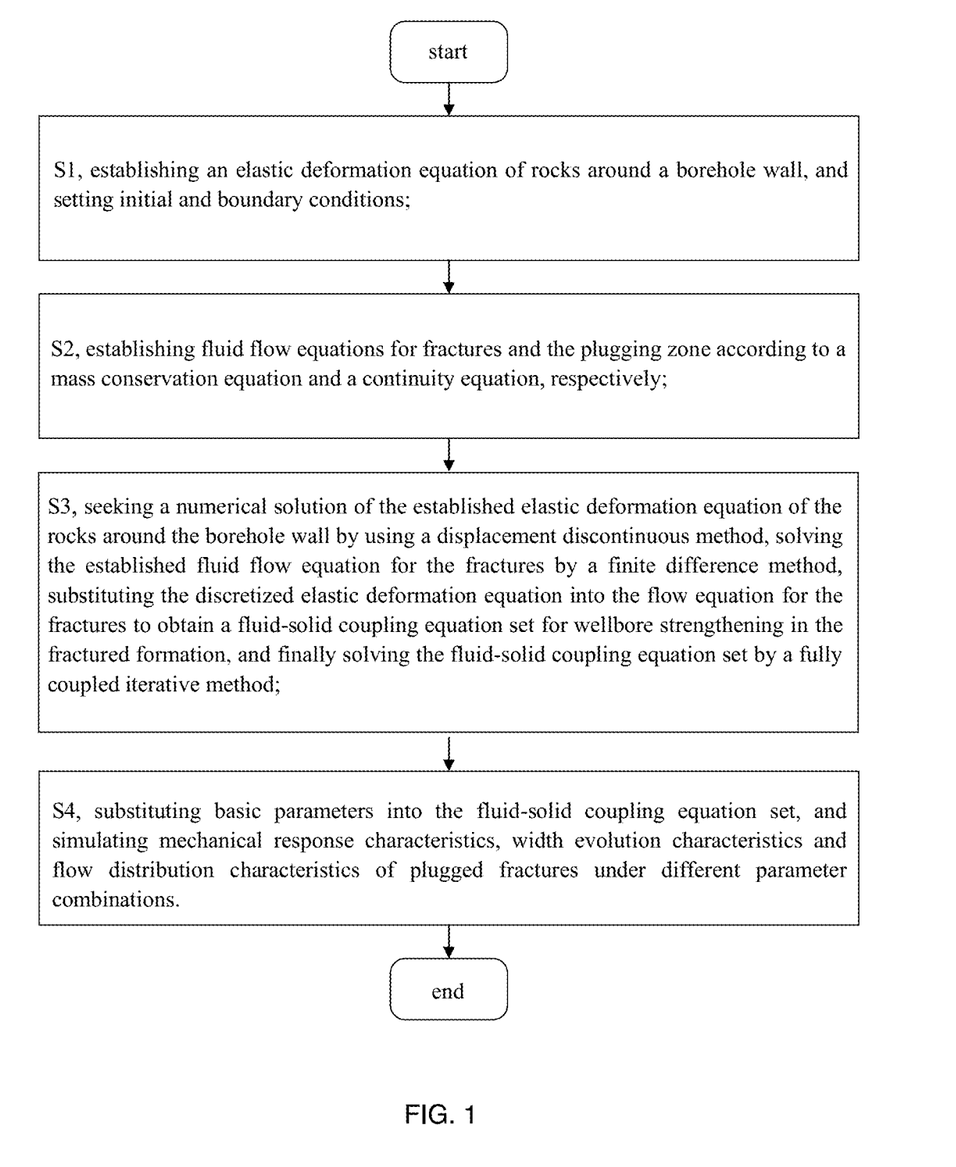
FIG. 1 is a flow chart of fluid-solid coupling numerical value calculation of fracture formation wellbore strengthening according to the present invention.

S3, referring to FIG. 1, seeking the numerical solution of the established elastic deformation equation of the rocks around the borehole wall by using displacement discontinuous method, solving the established fluid flow equation of fractures by a finite difference method, substituting the discretized elastic deformation equation into the flow equation of fractures to obtain a fluid-solid coupling equation set (the equations (1) and (14)) for wellbore strengthening in a fractured formation, and finally solving the fluid-solid coupling equation set by a fully coupled iterative method.

During calculation, if the fracture width at the plugged position is larger than the preset plugging zone width, the plugging zone is subjected to tensile instability, and an injected fluid bypasses the plugging zone to enter the fracture tip; and if the stress intensity factor at the plugged fracture tip is higher than the fracture toughness of a formation rock, plugging fails completely and fractures begin to propagate:

$$K_I = K_{IC} \quad (16)$$

wherein $$K_I = 0.806 \frac{E' w_{tip}}{4\sqrt{\Delta\xi/\pi}} \quad (17)$$

$$E' = \frac{E}{1-v^2} \quad (18)$$

wherein $K_I$ is the Mode-I stress intensity factor at the plugged fracture tip, MPa·m$^{0.5}$; $w_{tip}$ is the width near the fracture tip, m; $\Delta\xi$ is the length of a displacement discontinuity unit, m; and $K_{IC}$ is the fracture toughness of formation rock, MPa·m$^{0.5}$; E is elastic modulus of formation rock, GPa; v is Poisson's ratio, dimensionless.

S4, substituting in-situ stresses parameters, rock mechanics parameters, fracture geometric parameters, plugging zone geometric and permeability parameters, fluid viscosity and displacement parameters into the fluid-solid coupling equation set, and simulating the mechanical responses, width evolution and flow distribution characteristics of plugged fractures under different parameter combinations, thereby obtaining the transient responses of wellbore pressure, hoop stress around the wellbore, fracture width evolution, fracture internal pressure, influx in fracture and the contact stress between plugging zone and fracture surfaces before and after the wellbore strengthening.

TABLE 1 basic parameters for wellbore strengthening numerical simulation in a fractured formation

| Parameter | Value | Unit |
|---|---|---|
| Critical stress intensity factor ($K_{IC}$) | 1.00 | MPa · m$^{0.5}$ |
| Elastic modulus (E) | 20.00 | GPa |
| Poisson's ratio (v) | 0.22 | / |
| Length of plugging zone (a) | 12.00 | mm |
| Plugging position parameter (b) | 24.00 | mm |
| Fracture length (L) | 120.00 | mm |
| Borehole radius ($r_w$) | 100.00 | mm |
| Maximum horizontal principal stress ($\sigma_H$) | 41.40 | MPa |
| Minimum horizontal principal stress ($\sigma_h$) | 34.50 | MPa |
| Permeability of fracture plugging zone ($K_z$) | 35.00 | mD |
| Formation pore pressure ($P_p$) | 20.00 | MPa |
| Viscosity of injected fluid ($\mu$) | 40.00 | mPa · s |
| Injected flow rate ($Q_0$) | 0.0004 | m$^2$/s |

Figure 3:
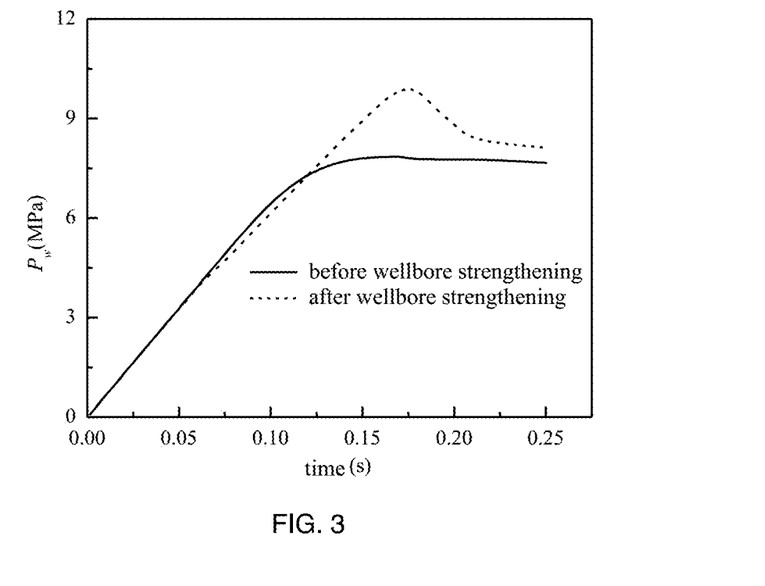
FIG. 3 is response curves of well wall pressures before and after the wellbore strengthening of the present invention.

Referring to FIG. 3, wellbore strengthening by plugging the wellbore fractures can significantly improve the wellbore fracture propagation pressure. By comparing the peak wellbore pressures before and after wellbore strengthening, it can be found that the wellbore fracture propagation pressure is improved by 24.7% after the wellbore strengthening.

Figure 4:
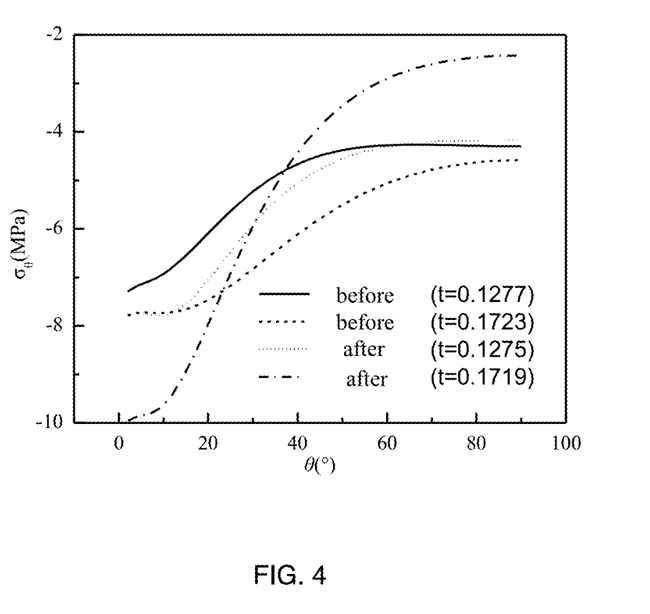
FIG. 4 is distribution curves of well wall hoop stresses before and after the wellbore strengthening of the present invention.

Referring to FIG. 4, the hoop stress around the wellbore always appear as compressive stress (a compressive stress is specified to be negative and a tensile stress to be positive), and shows a tendency to increase with the presence of the plugging zone. Since the hoop stress around the wellbore is greatly influenced by the wellbore pressure and the fracture internal pressure, the hoop stress around the wellbore always show a trend of increasing with continuous fluid injection for the two cases. However, the hoop stress around the wellbore after the wellbore strengthening are always lower than those of unplugged fractures in the angular range from 0° to 23°.

Figure 5:
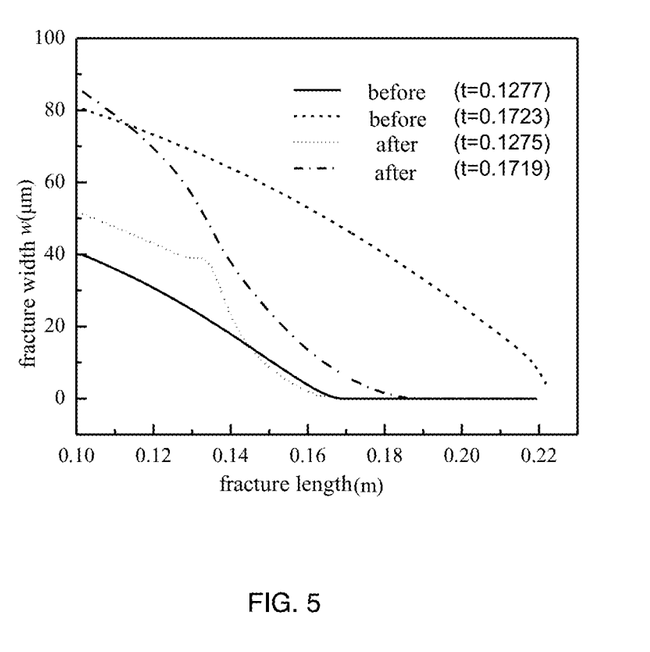
FIG. 5 is evolution curves of fracture widths before and after the wellbore strengthening of the present invention.
Figure 6:
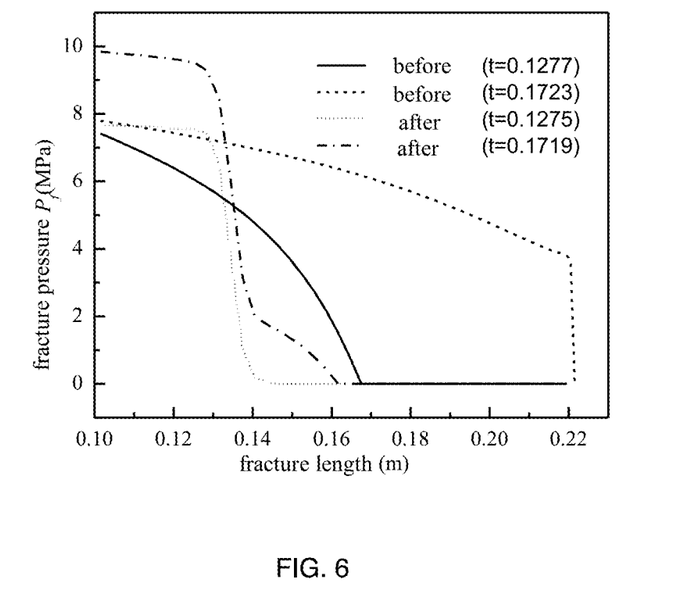
FIG. 6 is distribution curve of fracture pressures before and after the wellbore strengthening of the present invention.

Referring to FIGS. 5 and 6, it can be seen that the opening and the internal pressure of the fracture unit at the front of the plugging zone are always larger than that of the unplugged fracture in the same simulation time, while the fracture unit close to the fracture tip shows opposite variations. Because the pressure transport along the fracture length is restricted by the plugging zone. In the plugged fractures, as the fluid continues to be injected, a large volume of fluid is stored in the fracture portion between wellbore wall and the plugging zone, leading to an increase in fracture width and fracture internal pressure within that area. Meanwhile, portions near the fracture tip remain closed for a long period of time due to lack of fluid supply.

Figure 7:
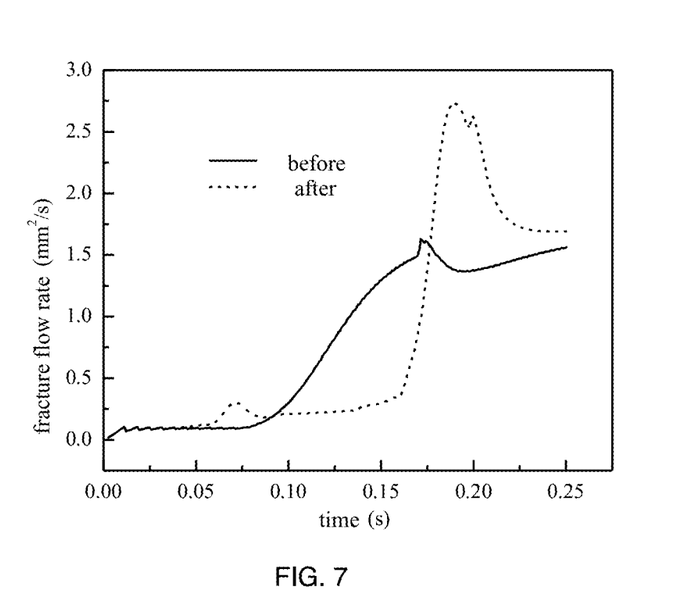
FIG. 7 is variation curves of fracture flow rate before and after the wellbore strengthening of the present invention.

Referring to FIG. 7, due to geometrical symmetry, the variation of influxes for each fracture is the same and thus the injection rate is provided for one fracture. It can be seen that the injection rate of the unplugged fracture increases with the increase of injection time. In fracture propagation stage, the influx of the fracture shows a slight decrease trend, and then slowly increases with continuous propagation of the wellbore fracture. While for the plugged fracture, after the fluid front arrives in the front of the plugging zone, the influx of the fracture will keep at a comparatively low level for a long time due to the restriction of the plugging zone. The injected fluid will bypass the plugging zone to reach the tip of the fracture only until the fracture width is larger than the initial width of plugging zone.

Figure 8:
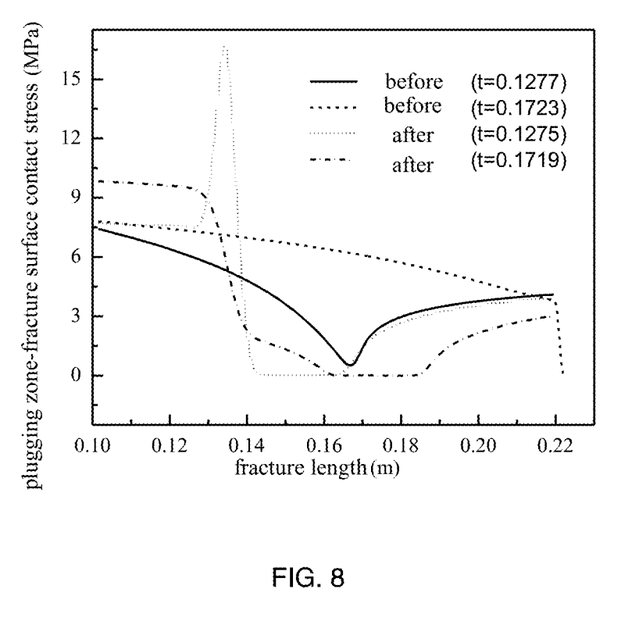
FIG. 8 is response curves of plugging zone-fracture surface contact stresses before and after the wellbore strengthening of the present invention.

Referring to FIG. 8, at the initial stage of fracture plugging, it will generate a very significant contact compressive stress between the plugging zone and the fracture surface, which further restrict the fluid flow in the plugging zone. However, as fluid continues to be injected, the pressure in the fracture will be increased continuously, and in turn lead to plugging failure. Ultimately, the interaction between the plugging zone and the fracture surface is eliminated. When the wellbore fracture is completely opened, this contact compressive stress will be equal to the fracture internal pressure.

The above are only the preferred embodiments of the present invention, and do not limit the present invention in any form. Although the present invention has been disclosed as the preferred embodiments, it is not thus limited. Those skilled in the art, without departing from the scope of the technical solution of the present invention, can make use of the technical content disclosed above to make slight changes or modification into equivalent embodiments with equivalent changes. However, any content that does not deviate from the technical solution of the present invention, as well as simple modifications, equivalent changes and modifications made to the above embodiments according to the technical solutions the present invention, are still within the protection scope of the present invention.

What is claimed is:

1. A fluid-solid coupling numerical simulation method for evaluating a wellbore strengthening effect of a fractured formation, comprising steps of:

S1, establishing an elastic deformation equation of rocks around a borehole wall, and setting initial and boundary conditions;

wherein the elastic deformation equation of the rocks around the borehole wall is:

$$\Sigma_{j=1}^{N}(H_{sn})_{ij}[u_s^j]+\Sigma_{j=1}^{N}(H_{nm})_{ij}[u_n^j]=\sigma_n(s_i)-P_f(s_i)$$

$$\Sigma_{j=1}^{N}(H_{ss})_{ij}[u_s^j]+\Sigma_{j=1}^{N}(H_{ns})_{ij}[u_n^j]=0 \quad (1)$$

wherein $$H_{ss} = \frac{E}{1+v}[\cos 2\beta f_{xy} - \sin 2\beta f_{xx} - y(\cos 2\beta f_{xyy} - \sin 2\beta f_{yyy})]\sin 2\beta + \frac{E}{1+v}[\sin 2\beta f_{xy} - \cos 2\beta f_{xx} + y(\sin 2\beta f_{xyy} + \cos 2\beta f_{yyy})]\cos 2\beta \quad (2)$$

$$H_{sn} = \frac{E}{1+v}[-y(\sin 2\beta f_{xyy} + \cos 2\beta f_{yyy})]\sin 2\beta + \frac{E}{1+v}[-y(\cos 2\beta f_{xyy} + \sin 2\beta f_{yyy})]\cos 2\beta$$

$$H_{ns} = \frac{E}{1+v}[2\cos^2\beta f_{xy} + \sin 2\beta f_{xx} + y(\cos 2\beta f_{xyy} - \sin 2\beta f_{yyy})]\sin^2\beta - \frac{E}{1+v}[\sin 2\beta f_{xy} - \cos 2\beta f_{xx} + y(\sin 2\beta f_{xyy} + \cos 2\beta f_{yyy})]\sin 2\beta + \frac{E}{1+v}[2\sin^2\beta f_{xy} - \sin 2\beta f_{xx} - y(\cos 2\beta f_{xyy} - \sin 2\beta f_{yyy})]\cos^2\beta$$

$$H_{nn} = \frac{E}{1+v}[-f_{xy} + y(\sin 2\beta f_{xyy} + \cos 2\beta f_{yyy})]\sin^2\beta - \frac{E}{1+v}[-y(\cos 2\beta f_{xyy} + \sin 2\beta f_{yyy})]\sin 2\beta +$$

-continued $$\frac{E}{1+v}[-f_{xy} - y(\sin 2\beta f_{xyy} + \cos 2\beta f_{yyy})]\cos^2\beta$$

in the equation (2), $$f_{xy} = \frac{1}{4\pi(1-v)}\left[\frac{y}{(x-L)^2+y^2} - \frac{y}{(x+L)^2+y^2}\right] \quad (3)$$

$$f_{yy} = -f_{xx} = \frac{-1}{4\pi(1-v)}\left[\frac{x-L}{(x-L)^2+y^2} - \frac{x+L}{(x+L)^2+y^2}\right]$$

$$f_{xyy} = \frac{1}{4\pi(1-v)}\left\{\frac{(x-L)^2-y^2}{[(x-L)^2+y^2]^2} - \frac{(x+L)^2-y^2}{[(x+L)^2+y^2]^2}\right\}$$

$$f_{yyy} = \frac{2y}{4\pi(1-v)}\left\{\frac{x-L}{[(x-L)^2+y^2]^2} - \frac{x+L}{[(x+L)^2+y^2]^2}\right\}$$

$$\sigma_n(x) = \sigma_h\left(1 + \frac{R^2}{x^2}\right) + \frac{\sigma_H - \sigma_h}{2}\left(\frac{R^2}{x^2} - 3\frac{R^4}{x^4}\right) \quad (4)$$

assumptions used for establishing the elastic deformation equation of the rocks around the borehole wall are: bi-wing fractures emanating from the wellbore are distributed along a maximum horizontal stress direction, and formations around the fractures are isotropic and impermeable elastic media;
the initial and boundary conditions of the elastic deformation equation of the rocks around the borehole wall are:
a fluid pressure at a fracture mouth is equal to a wellbore pressure, and the fracture opening and shearing displacement discontinuities at a fracture tip are identically equal zero:

$$P_{fi}(R,t) = P_w \quad (6)$$

$$w(R+L,t) = u(R+L,t) = 0 \quad (7)$$

wherein $H_{ij}(i,j=n,s)$ are hypersingular Green's functions derived by stress components in an arbitrary position, MPa/m; $f_{xy}$ and $f_{yy}$ are stress components related to partial derivative of a function $f$, m$^{-1}$; $f_{xyy}$ and $f_{yyy}$ are stress components related to partial derivative of the function $f$, m$^{-2}$; $\sigma_H$ is a maximum horizontal stress, MPa; $\sigma_h$ is a minimum horizontal stress, MPa; $\sigma_n$ is a normal stress on a fracture surface, MPa; $Pf$ is a fluid pressure in a fracture, MPa; $[u_n^j]$ is a normal displacement discontinuity of a j-th fracture unit, m; $[u_s^j]$ is a shear displacement discontinuity of the j-th fracture unit, m; L is a fracture length, m; R is a borehole radius, mm; E is an elastic modulus of a formation rock, GPa; v is a Poisson's ratio, dimensionless; s is a horizontal ordinate of a fracture unit at any position along a fracture length direction, m; β is an x-direction included angle between a local coordinate system and a global coordinate system of the fracture unit, °; $P_{f,t}$ is the fluid pressure at the fracture mouth, MPa; $P_w$ is the wellbore pressure, MPa; w is the fracture opening, m; u is the shearing displacement identically equal, m; R is a wellbore radius, mm; L is a fracture length, m; t is time, s;
S2, establishing fluid flow equations for fractures and the plugging zone according to a mass conservation equation and a continuity equation, respectively;
wherein after the plugging zone is formed, a fluid flow in fractures consists of two states: a laminar flow and a Darcy flow, and the fluid flow inside the opened fractures is:

$$\frac{\partial w}{\partial t} = \frac{\partial}{\partial s}\left[\frac{w^3}{\mu'}\frac{\partial P_f}{\partial s}\right] \quad (8)$$

a fluid flow within the plugging zone is:

$$\frac{\partial P_f}{\partial t} - \frac{1}{12\mu\chi_1}\frac{\partial}{\partial s}\left(\overline{\omega}^2\frac{\partial P_f}{\partial s}\right) + \frac{\overline{\omega}_0}{\chi_1\chi_2\overline{\omega}}\frac{\partial(|u|)}{\partial t} = 0 \quad (14)$$

wherein $$\chi_2 = \begin{cases} const & \text{when } |u| \leq L_c \\ \infty & \text{when } |u| > L_c \end{cases} \quad (15)$$

initial and boundary conditions of the plugging zone flow equation is:
after a stable plugging zone is formed in wellbore fractures, an injection rate is equal to total influxes of the wellbore fractures with continuous injection of a drilling fluid:

$$\sum_{i=1}^{N} q_i(0,t) = Q_0 \quad (5)$$

wherein $P_f$ is a fracture internal pressure, MPa; s is a horizontal ordinate of a fracture unit at any position along a fracture length direction, m; w is a fracture opening, m; t is time, s; $q_i$ is an injection flux into a fracture i, m$^2$/s; $Q_0$ is the injection rate, m$^2$/s; μ is a dynamic viscosity of and injected fluid, mPa·s; $P_f$ is a fluid pressure in fractures at a plugged location, MPa; $\overline{\omega}$ is an effective hydraulic aperture of the plugging zone, m; $\chi_1$ is a compressibility of the plugging zone, 1/Pa; $\chi_2$ is a shear-expansion characteristic of the plugged fractures, m; u is shearing displacement discontinuities, m; t is time, s; $\overline{\omega}_0$ is an initial hydraulic aperture of the plugging zone, m; μ is a parameter related to a fluid viscosity, mPa·s, and μ'=12μ; $L_c$ is a critical slippage parameter, mm;
S3, determining a numerical solution of the established elastic deformation equation of the rocks around the borehole wall by using a displacement discontinuous method, solving the established fluid flow equation for the fractures by a finite difference method, substituting the discretized elastic deformation equation into the flow equation for the fractures to obtain a fluid-solid coupling equation set for wellbore strengthening in the fractured formation, and finally solving the fluid-solid coupling equation set by a fully coupled iterative method;
S4, substituting basic parameters into the fluid-solid coupling equation set, and simulating mechanical response characteristics, width evolution characteristics and flow distribution characteristics of plugged fractures under different parameter combinations; and
S5, according to the mechanical response characteristics, the width evolution characteristics and the flow distribution characteristics simulated in in the step S4, choosing one of the parameter combinations, and plugging the wellbore fractures with the parameter combinations, so as to improve wellbore fracture propagation pressure.

2. The fluid-solid coupling numerical simulation method, as recited in claim 1, wherein in the step S3, when solving the fluid-solid coupling equation set, if a fracture width at a plugged position is larger than a preset plugging zone width, the plugging zone is subjected to tensile instability, and an injected fluid bypasses the plugging zone to enter a fracture tip; and if a stress intensity factor at a plugged fracture tip is higher than a fracture toughness of a formation rock, plug fails completely and fractures begin to propagate:

$$K_I = K_{IC} \tag{16}$$

wherein $$K_I = 0.806 \frac{E' w_{tip}}{4\sqrt{\Delta\xi/\pi}} \tag{17}$$

$$E' = \frac{E}{1-v^2} \tag{18}$$

wherein $K_I$ is a Mode-I stress intensity factor at the plugged fracture tip, MPa·m$^{0.5}$; $w_{tip}$ is a width near the fracture tip, m; $\Delta\xi$ is a length of a displacement discontinuity unit, m; and $K_{IC}$ is the fracture toughness of formation rock, MPa·m$^{0.5}$; E is an elastic modulus, GPa; E' is a plane strain elastic modulus, GPa.

3. The fluid-solid coupling numerical simulation method, as recited in claim 1, wherein in the step S4, the basic parameters comprise in-situ stress parameters, rock mechanics parameters, fracture geometric parameters, plugging zone geometric and permeability parameters, a fluid viscosity and a displacement.

\* \* \* \* \*